US012558997B2

(12) United States Patent
Yang et al.

(10) Patent No.: US 12,558,997 B2
(45) Date of Patent: Feb. 24, 2026

(54) BATTERY PRE-CONDITIONING SYSTEM AND OPERATING METHOD THEREOF

(71) Applicants: Hyundai Motor Company, Seoul (KR); Kia Corporation, Seoul (KR)

(72) Inventors: Jin Woo Yang, Seongnam-si (KR); Yong Seok Park, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 572 days.

(21) Appl. No.: 18/062,480

(22) Filed: Dec. 6, 2022

(65) Prior Publication Data

US 2024/0034194 A1 Feb. 1, 2024

(30) Foreign Application Priority Data

Jul. 26, 2022 (KR) ........................ 10-2022-0092533

(51) Int. Cl.
| | |
|---|---|
| *H01M 10/615* | (2014.01) |
| *B60L 58/27* | (2019.01) |
| *H01M 10/42* | (2006.01) |
| *H01M 10/44* | (2006.01) |
| *H01M 10/625* | (2014.01) |
| *H01M 10/63* | (2014.01) |
| *B60L 53/62* | (2019.01) |

(52) U.S. Cl.
CPC ........... *B60L 58/27* (2019.02); *H01M 10/425* (2013.01); *H01M 10/44* (2013.01); *H01M 10/615* (2015.04); *H01M 10/625* (2015.04); *H01M 10/63* (2015.04); *B60L 53/62* (2019.02); *H01M 2010/4271* (2013.01); *H01M 2220/20* (2013.01)

(58) Field of Classification Search
CPC ........... B60L 2240/545; B60L 2240/70; B60L 2240/72; B60L 2240/80; B60L 2260/50; B60L 53/11; B60L 53/62; B60L 53/66; B60L 58/12; B60L 58/27; H01M 10/425; H01M 10/44; H01M 10/615; H01M 10/625; H01M 10/63; H01M 2010/4271; H01M 2220/20
See application file for complete search history.

(56) References Cited

U.S. PATENT DOCUMENTS

| | | | |
|---|---|---|---|
| 10,044,080 B2 | 8/2018 | Kim et al. | |
| 2025/0167331 A1* | 5/2025 | Hashimoto | ......... H01M 10/613 |

FOREIGN PATENT DOCUMENTS

| | | | | |
|---|---|---|---|---|
| CN | 114340924 A | * | 4/2022 | ........ H02J 7/007194 |
| KR | 20150059247 A | | 6/2015 | |

OTHER PUBLICATIONS

Machine translation CN114340924A (Year: 2022).*

* cited by examiner

*Primary Examiner* — Victoria H Lynch
(74) *Attorney, Agent, or Firm* — SLATER MATSIL, LLP

(57) ABSTRACT

An embodiment method of operating a battery pre-conditioning system includes checking charging station information including an estimated waiting time for a charging start from arrival at a charging station when an input for a destination corresponds to the charging station and starting a battery warming based on a target temperature reaching time for a battery temperature to reach a target temperature, the estimated waiting time, and a remaining time until the arrival at the charging station.

20 Claims, 6 Drawing Sheets

| | REMAINING TIME UNTIL ARRIVAL | REMAINING TIME UNTIL ARRIVAL +ESTIMATED WAITING TIME | STATES OF VEHICLE |
|---|---|---|---|
| 10:00 | 40 MINUTES | 60 MINUTES | DEPARTURE FOR CHARGING STATION (TARGET TEMPERATURE REACHING TIME :30 MINUTES) |
| 10:10 | 30 MINUTES | 50 MINUTES | |
| 10:20 | 20 MINUTES | 40 MINUTES | |
| 10:30 | 10 MINUTES | 30 MINUTES | |
| 10:40 | 0 MINUTES | 20 MINUTES | ARRIVAL AT CHARGING STATION |
| 10:50 | | 10 MINUTES | |
| 11:00 | | 0 MINUTES | CHARGING START |

BATTERY PRE-CONDITIONING SYSTEM AND OPERATING METHOD THEREOF

CROSS-REFERENCE TO RELATED APPLICATIONS

This application claims the benefit of Korean Patent Application No. 10-2022-0092533, filed on Jul. 26, 2022, which application is hereby incorporated herein by reference.

TECHNICAL FIELD

The disclosure relates to a battery pre-conditioning system and an operating method thereof.

BACKGROUND

An electrified vehicle refers to a vehicle that employs an electric motor as a driving source, and, in particular, includes a plug-in hybrid electric vehicle (PHEV) or electric vehicle (EV) of which a battery is chargeable with external power through connection of a charging plug.

When the battery is charged, the temperature of the battery significantly affects charging time. Thus, the temperature of the battery is appropriately raised in advance by a method or the like of circulating a fluid (e.g., water) heated by an electric heater around the battery, thereby having an effect on shortening the charging time. Such control of previously raising the temperature of the battery is called "battery conditioning" or "battery pre-conditioning."

Such a battery pre-conditioning technique is generally carried out based on a destination. In a case where the charging station is set as a destination, the battery is warmed up to a target temperature by a heater or the like until arriving at the destination, and the warming is terminated when the vehicle arrives at the destination or the temperature of the battery reaches the target temperature.

However, the battery pre-conditioning technique based on such a destination could not cope with a queue for the charging station because the battery warming is terminated at the moment when arriving at the charting station. Although the temperature of the battery has reached the target temperature, the target temperature is not maintained but lowered by the outside air because the battery pre-conditioning is not performed while waiting for charging due to the queue for the charging station. Therefore, the target temperature of the battery is not reached at an actual charging start time, and thus it takes more time to charge up the battery because the battery is charged at a low temperature.

Meanwhile, additional control may be performed to raise the temperature of the battery even after arriving at the charging station. In this case, it is possible to maintain the target temperature of the battery during the charging, but a charging efficiency is low due to additional energy consumption.

Accordingly, it is necessary to efficiently perform the battery pre-conditioning through control of the battery warming time.

Matters described as the related art are provided merely for promoting understanding for the background of embodiments of the disclosure, and should not be taken as the prior art already known to a person having ordinary knowledge in the art.

SUMMARY

The disclosure relates to a battery pre-conditioning system and an operating method thereof. Particular embodiments relate to a battery pre-conditioning system and a method of operating the same, in which battery pre-conditioning is performed based on an estimated waiting time or a location of a charging station.

An embodiment of the disclosure provides a battery pre-conditioning system and a method of operating the same, in which battery pre-conditioning is performed by taking a standby condition of a charging station into account, thereby improving charging performance.

Technical problems solvable by embodiments of the disclosure are not limited to the aforementioned technical problems, and other unmentioned technical problems can be clearly understood from the following description by a person having ordinary knowledge in the art to which the disclosure pertains.

According to an embodiment of the disclosure, a method of operating a battery pre-conditioning system includes checking charging station information including an estimated waiting time for a charging start from after arriving at a charging station when an input for a destination corresponds to the charging station and starting battery warming based on a target temperature reaching time expected to take for a battery temperature to reach a target temperature, the estimated waiting time, and a remaining time until arriving at the charging station.

The starting the battery warming may include starting the battery warming at a point in time when the target temperature reaching time is greater than or equal to a sum of the estimated waiting time and the remaining time until the arrival.

The operation method may further include terminating the battery warming when the battery temperature reaches the target temperature or when the target temperature reaching time has elapsed.

The operation method may further include terminating the battery warming at a point in time when a distance between a vehicle and the charging station is longer than or equal to a preset distance after the vehicle arrives at the charging station.

The operation method may further include determining whether or not conditioning conditions are satisfied, based on at least one of a battery temperature, whether a battery pre-conditioning mode is activated or not, whether the charging starts or not, or whether the charging station supports fast charging or super-fast charging, wherein the starting the battery warming includes starting the battery warming based on the target temperature reaching time, the estimated waiting time, and the remaining time until the arrival when the conditioning conditions are satisfied.

The operation method may further include checking whether the charging station is changed or not, when the estimated waiting time of the charging station corresponding to the input for the destination is longer than or equal to a preset period of time, and setting the destination based on a result of checking whether the charging station is changed or not.

The operation method wherein checking whether the charging station is changed or not may include recommending an additional charging station, which satisfies a certain condition, as the destination.

The operation method may further include displaying an operation state of the battery pre-conditioning.

According to an embodiment of the disclosure, a battery pre-conditioning system includes a destination manager configured to check charging station information including an estimated waiting time for a charging start from after arriving at a charging station when an input for a destination corresponds to the charging station and a battery manager configured to start battery warming based on a target temperature reaching time expected to take for a battery temperature to reach a target temperature, the estimated waiting time, and a remaining time until arriving at the charging station.

The battery manager may be configured to start the battery warming at a point in time when the target temperature reaching time is greater than or equal to a sum of the estimated waiting time and the remaining time until the arrival.

The battery manager may be configured to terminate the battery warming when the battery temperature reaches the target temperature or when the target temperature reaching time has elapsed.

The battery manager may be configured to terminate the battery warming at a point in time when a distance between a vehicle and the charging station is longer than or equal to a preset distance after the vehicle arrives at the charging station.

The battery manager may be configured to determine whether or not conditioning conditions are satisfied, based on at least one of a battery temperature, whether a battery pre-conditioning mode is activated or not, whether the charging starts or not, or whether the charging station supports fast charging or super-fast charging, and to start the battery warming based on the target temperature reaching time, the estimated waiting time, and the remaining time until the arrival when the conditioning conditions are satisfied.

The destination manager may be configured to check whether the charging station is changed or not, when the estimated waiting time of the charging station corresponding to the input for the destination is longer than or equal to a preset period of time, and set the destination based on a result of checking whether the charging station is changed or not.

The destination manager may be configured to recommend an additional charging station, which satisfies a certain condition, as the destination.

The battery pre-conditioning system may further include a display configured to display an operation state of the battery pre-conditioning.

The display may include at least one of a cluster of a vehicle, an audio/video/navigation/telematics (AVNT), or a combination thereof.

The destination manager may include the AVNT of the vehicle.

The battery manager may include at least one of a battery management system (BMS) of a vehicle, a vehicle control unit, a hybrid control unit, or combination thereof.

According to an embodiment of the disclosure, a battery pre-conditioning system includes a destination manager configured to check charging station information including a distance between a vehicle and a charging station after arriving at the charging station when an input for a destination corresponds to the charging station, and a battery manager configured to terminate battery warming at a point in time when the distance between the vehicle and the charging station is longer than or equal to a preset distance after the vehicle arrives at the charging station.

Problems solvable by embodiments of the disclosure may not be limited by the aforementioned problems, and other unmentioned problems can be clearly understood from the following description by those skilled in the art.

With the foregoing configurations of the battery pre-conditioning system and the method of operating the same according to at least one embodiment of the disclosure, an actual charging start time is more accurately predicted to control the battery pre-conditioning.

Further, a user's intention of waiting for the charging is determined, and it is possible to prevent the battery pre-conditioning from being wastefully performed when the user has no intention of waiting for the charging.

In this way, the charging starts at the target battery temperature, thereby improving a charging efficiency and minimizing the unnecessary battery pre-conditioning.

Effects obtainable from embodiments of the disclosure may not be limited by the aforementioned effects, and other unmentioned effects can be clearly understood from the following description by a person having ordinary knowledge in the art to which the disclosure pertains.

BRIEF DESCRIPTION OF THE DRAWINGS

FIG. 2 shows an example of an electrified vehicle in which a battery pre-conditioning system according to an embodiment of the disclosure is implemented.

FIG. 3 shows an example of a process for performing battery pre-conditioning according to embodiments of the disclosure.

DETAILED DESCRIPTION OF ILLUSTRATIVE EMBODIMENTS

Figure 1:
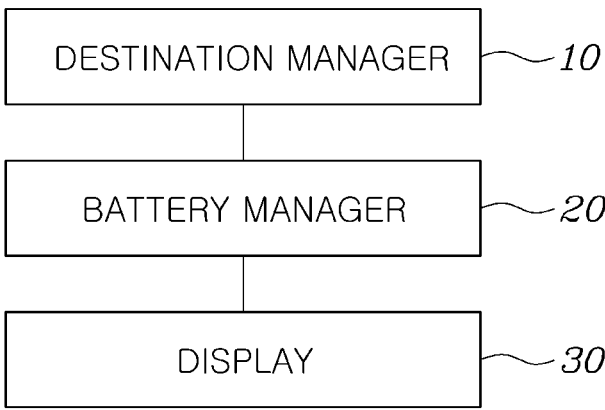
FIG. 1 is a block diagram of a battery pre-conditioning system according to an embodiment of the disclosure.

Regarding embodiments of the disclosure disclosed in this specification or application, the specific structural or functional description is merely illustrative for the purpose of describing the embodiments of the disclosure, and embodiments of the disclosure may be implemented in various forms but should not be construed as being limited to the embodiments set forth in this specification or application.

Because the embodiments of the disclosure may be variously modified and have various forms, specific exemplary embodiments will be illustrated in the drawings and described in detail in this specification or application. However, it should be understood that embodiments of the disclosure are intended not to be limited to the specific embodiments but to cover all modifications, equivalents or alternatives without departing from the spirit and technical scope of the disclosure.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

Hereinafter, embodiments of the disclosure will be described in detail with reference to the accompanying drawings, in which the same or similar elements are denoted by the same reference numerals even though they are depicted in different drawings and redundant descriptions thereof will be avoided.

Suffixes "module" and "unit" put after elements in the following description are given in consideration of only ease of description and do not have meaning or functions discriminated from each other.

In terms of describing the embodiments of the disclosure, detailed descriptions of related art will be omitted when they may make the subject matter of the embodiments of the disclosure rather unclear. In addition, the accompanying drawings are provided only for a better understanding of the embodiments of the disclosure and are not intended to limit technical ideas of the disclosure. Therefore, it should be understood that the accompanying drawings include all modifications, equivalents and substitutions within the scope and sprit of the disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected" or "directly coupled" to another component, it should be understood that additional components may be absent between the one component and another component.

Unless the context clearly dictates otherwise, singular forms include plural forms as well.

In the disclosure, it should be understood that term "include" or "have" indicates that a feature, a number, a step, an operation, an element, a part, or the combination thereof described in the embodiments is present, but does not preclude a possibility of presence or addition of one or more other features, numbers, steps, operations, elements, parts or combinations thereof, in advance.

Further, the term "unit" or "control unit" forming part of the names of a motor control unit (MCU), a hybrid control unit (HCU), etc., are merely terms that are widely used in the naming of a controller for controlling a specific function of a vehicle, and should not be construed as meaning a generic function unit.

Each control unit may include a communication device that communicates with other control units or sensors, in order to control its own functions, a memory that stores an operating system, logic commands, and input/output information, and one or more processors that perform determination, calculation, decision, and the like, which is necessary for the control of the function that is responsible therefor.

According to embodiments of the disclosure, in terms of performing control for battery pre-conditioning in an electrified vehicle of which a battery is chargeable with external power, it is proposed that the battery is warmed based on an estimated waiting time for a charging start in a charging station set as a destination, and a distance between the vehicle and the charging station to efficiently perform the battery pre-conditioning, and to improve a charging efficiency.

Prior to describing a method of operating a battery pre-conditioning system according to embodiments of the disclosure, the configuration of the battery pre-conditioning system will be first described with reference to FIG. 1.

Referring to FIG. 1, the battery pre-conditioning system according to an embodiment includes a destination manager 10 and a battery manager 20, and may further include a display 30. FIG. 1 mainly shows elements related to the embodiments of the disclosure, and it will be understood that more or fewer elements may be included to actually implement the battery pre-conditioning system. Below, the elements will be described in detail.

The destination manager 10 receives an input for a destination of a vehicle and determines whether the input destination corresponds to a charging station. When the input is made for the destination corresponding to the charging station, charging station information including an estimated waiting time for a charging start from arrival at that charging station is checked. In this case, the charging station information may be provided by a server or the like connected to the destination manager 10 and a charging station management system.

The estimated waiting time included in the charging station information may refer to time that the vehicle is expected to wait after arriving at the charging station for reasons such as other vehicles using the chargers of the charging station. Further, the estimated waiting time may be varied depending on the number of chargers at that charging station, the number of waiting vehicles, and the like.

Further, the destination manager 10 sets the destination based on the charging station information when the charging station information is checked. In this case, the destination may be set based on the estimated waiting time included in the charging station information. In more detail, the destination manager 10 may determine whether the estimated waiting time of the charging station set as the destination is longer than or equal to a preset period of time and may determine whether to change the charging station when the estimated waiting time is longer than or equal to the preset period of time. Then, the destination is set according to results from determining whether to change the charging station. Here, the preset period of time is used as a criterion for asking whether to leave the input charging station as the destination despite having to wait for a long time to recharge the vehicle at that charging station. If a user intends to wait, then the user will want to leave the destination unchanged. On the other hand, if the user does not intend to wait, the user wants to change the destination. Thus, the user can reflect the user's own intention to wait or change the charging station through the check of the destination manager 10.

Further, the destination manager 10 may recommend additional charging stations, which satisfy a certain condition, as the destination while asking a user whether to change the charging station. Thus, a user can easily determine whether to change the charging station in consideration of the recommended charging stations. In this case, the charging stations satisfying the certain condition may be determined based on the estimated waiting time of the charging station, the distance to the charging station, the infrastructure of the charging station, and the like.

Meanwhile, the battery manager 20 may determine whether or not conditioning conditions are satisfied. To determine whether or not the conditioning conditions are satisfied, at least one among a battery temperature, whether a battery pre-conditioning mode is activated, whether the charging starts, or whether the charging station set as the destination supports fast charging or super-fast charging, and combinations thereof may be taken into account.

In more detail, the battery pre-conditioning is intended to mitigate decreases in a charging efficiency when the battery temperature is low. Therefore, the conditioning conditions may be set to perform the battery pre-conditioning only when the battery temperature is lower than a target temperature.

Further, to reflect a user's intention of performing the battery pre-conditioning, the conditioning conditions may be set to perform the battery pre-conditioning only when the battery pre-conditioning mode is activated by a user's input.

Further, there is no need of performing the battery pre-conditioning in a state that the charging has already started, and therefore the conditioning conditions may be set to perform the battery pre-conditioning only before the charging starts. In this case, whether the charging has started may be determined based on whether the charger is connected, or it may be determined that the charging has started when both the remaining time until arriving at the charging station and the estimated waiting time have elapsed.

Meanwhile, slow charging takes a relatively much longer time than fast charging or the like, and therefore the battery temperature is lowered again during a long charging process even though the battery is warmed by the battery pre-conditioning. Further, the slow charging is mostly performed in a parking lot or the like after traveling is finished, and there is also less need to shorten the charging time. Therefore, the conditioning conditions may be set to perform the battery pre-conditioning only when the charging station supports the fast charging or the super-fast charging.

Further, the battery manager 20 starts warming the battery based on a target temperature reaching time expected to take for the battery temperature to reach the target temperature, the estimated waiting time, and the remaining time until arriving at the charging station. By additionally considering the foregoing charging station information as well as arrival at the destination, it is possible to more accurately predict an actual charging start time and efficiently perform the battery pre-conditioning. Accordingly, wasteful energy consumption and additional control are reduced, and the charging time is shortened as the battery temperature is charged at a temperature closer to an optimum charging temperature.

Meanwhile, the battery pre-conditioning system according to an embodiment of the disclosure includes the destination manager to check the charging station information including a distance between a vehicle and a charging station after arriving at that charging station, when an input is made for the destination corresponding to the charging station, and the battery manager to terminate the battery warming at a point in time when the distance between the vehicle and the charging station is longer than or equal to a preset distance after the vehicle arrives at the charging station.

The distance between the vehicle and the charging station included in the charging station information may be obtained by the location of the vehicle and the location of the charging station included in map data, which are determined based on the global positioning system (GPS) or the like. Further, the destination manager 10 may determine a changed distance between the vehicle and the charging station when the location of the vehicle is changed due to traveling.

The start and end of the battery warming based on the estimated waiting time or the distance between the vehicle and the charging station will be described in detail later with reference to FIGS. 3 and 6.

Meanwhile, the battery pre-conditioning system according to an embodiment of the disclosure may further include the display 30. The display 30 displays the operation state of the battery pre-conditioning, so that a user can recognize the operation state of the battery pre-conditioning. A user who has recognized the operation state of the battery pre-conditioning through the display 30 may inactivate the battery pre-conditioning mode and terminate the battery pre-conditioning when s/he does not want to perform the battery pre-conditioning.

Below, detailed descriptions will be made by applying the configuration of the battery pre-conditioning system according to an embodiment of the disclosure, which has been described with reference to FIG. 1, to the vehicle.

Figure 2:
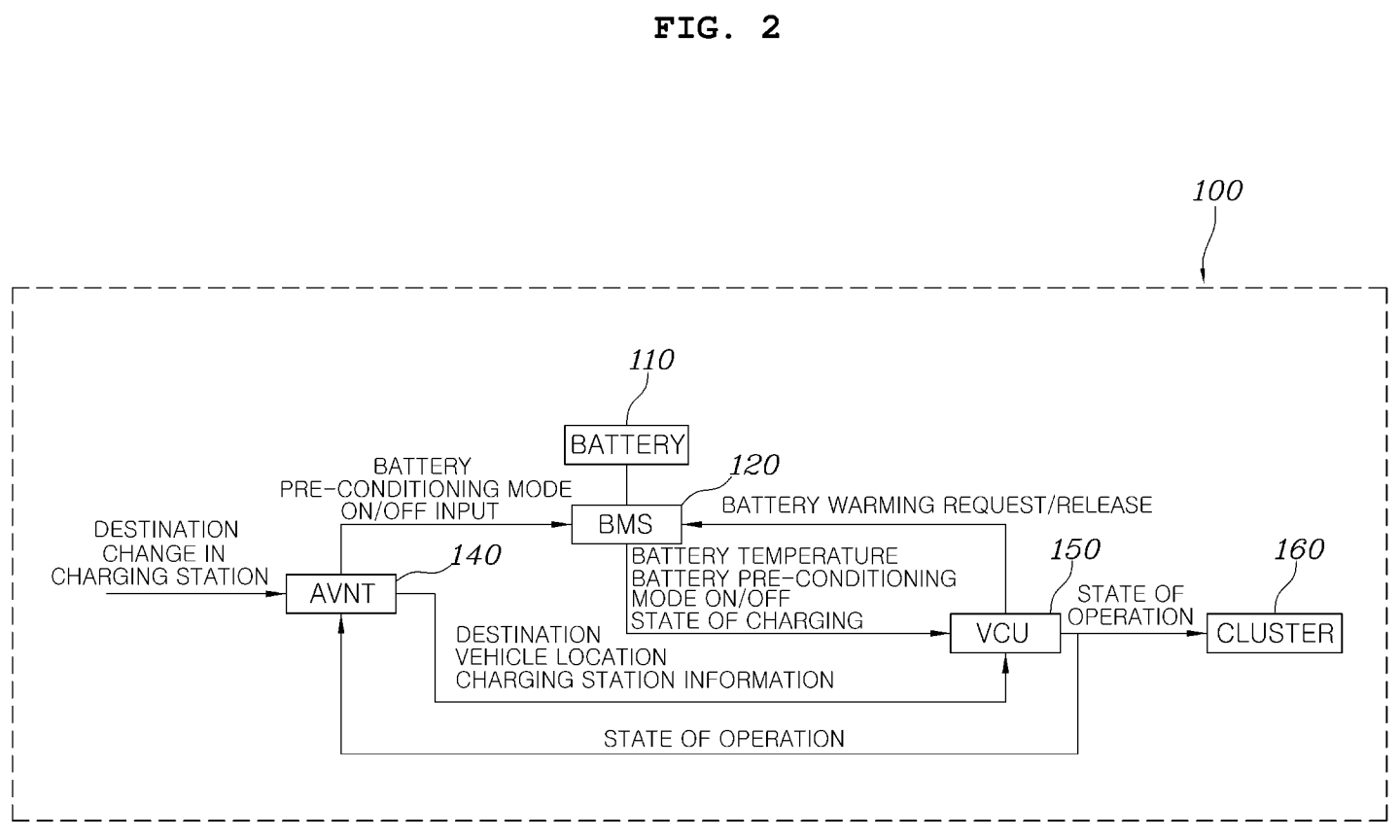

FIG. 2 shows an example of an electrified vehicle in which a battery pre-conditioning system according to an embodiment of the disclosure is implemented.

Referring to FIG. 2, the electrified vehicle 100, in which the battery pre-conditioning system according to an embodiment of the disclosure is implemented, includes a battery 110, a battery management system (BMS) 120, audio/video/navigation/telematics (AVNT) 140, a vehicle control unit (VCU) 150, and a cluster 160. FIG. 2 focuses on elements related to the embodiments of the disclosure, and it will be understood that more or fewer elements may be included to actually implement a vehicle.

First, the battery 110 may supply power to an electric motor (not shown) that is a driving source of the electrified vehicle 100, or may be charged with power generated through regenerative braking or the like in the electric motor. Further, the battery 11o may be charged with external power supplied through connection of a charging plug.

In the battery pre-conditioning system according to an embodiment of the disclosure, the destination manager 10 may be implemented as the AVNT 140 of the vehicle. The AVNT 140 may have a function of acquiring the charging station information by communicating with an external entity, for example, a charging management server, etc., in relation to the embodiments of the disclosure, as well as basic video/audio input/output functions. The AVNT 140 may receive a user's input about whether to activate the battery pre-conditioning mode, transmit the input to the BMS 120 or the like to be described later, or transmit the vehicle's destination, location, charging station information, etc., to the VCU 150.

Meanwhile, in the battery pre-conditioning system according to an embodiment of the disclosure, the battery manager 20 may include the BMS 120. The BMS 120 may manage the states of the battery, e.g., the state of charge (SOC), current, voltage, the state of health, etc., and in particular may manage the temperature of the battery in terms of performing the battery pre-conditioning.

Further, in the battery pre-conditioning system according to an embodiment of the disclosure, the battery manager 20 may include the VCU 150. The VCU 150 may acquire information about the battery temperature, whether the battery pre-conditioning mode is activated or not, the SOC of the battery, and the like from the BMS 120. Further, the VCU 150 may acquire the vehicle's destination, location, and charging station information from the AVNT 140. The VCU 150 may determine whether to perform the battery pre-conditioning based on the acquired information. In particular, according to an embodiment of the disclosure, the VCU 150 may determine the start and end of the battery warming based on the estimated waiting time or the distance between the vehicle and the charging station. When it is determined to perform the battery pre-conditioning, the VCU 150 may transmit a request for performing the battery pre-conditioning to the BMS 120 so as to warm the battery, so that the BMS 120 can warm the battery by a battery heater or the like according to the received request.

The battery manager 20 may be implemented to include a separate control unit or the like in addition to the BMS 120 and the VCU 150. In the case of a plug-in hybrid vehicle, the battery manager 20 may be implemented to include a hybrid control unit (HCU).

Meanwhile, in the battery pre-conditioning system according to an embodiment of the disclosure, the display 30 may include the cluster 160 of the vehicle. The cluster 160 may visually transmit information about the operation state of the battery pre-conditioning so as to be easily recognized by a user. Besides, the display 30 may be implemented as the AVNT 140 and perform the same functions as the AVNT 140, and the information about the operation state may be transmitted aurally as well as visually.

In terms of implementing the electrified vehicle 100 described with reference to FIG. 2, the configuration is merely an example and not necessarily limited to the foregoing description.

In terms of performing the battery pre-conditioning according to an embodiment of the disclosure, a process of starting the battery warming based on the estimated waiting time of the charging station set as the destination will be described below.

FIG. 3 shows an example of a process for performing battery pre-conditioning according to embodiments of the disclosure.

The battery pre-conditioning system according to an embodiment of the disclosure may start the battery warming based on the estimated waiting time of the charging station set as the destination. In this case, the battery warming may start when the target temperature reaching time expected to take for the battery temperature to reach the target temperature is greater than or equal to the sum of the remaining time until arriving at the charging station set as the destination and the estimated waiting time.

Referring to FIG. 3, the process of performing the battery pre-conditioning according to an embodiment of the disclosure is expressed according to time slots by way of example. Prior to the description, it will be assumed that the vehicle shown in FIG. 3 departs for the charging station at 10:00, a remaining time until arrival is 40 minutes at the departure point, an estimated waiting time is 20 minutes, and a target temperature reaching time is 30 minutes.

First, when only the remaining time until arrival is taken into account to perform the battery pre-conditioning, the battery is warmed according to the time of arriving at the charging station. Therefore, the battery warming starts at 10:10, i.e., when the target temperature reaching time is longer than or equal to the remaining time until arrival. After 30 minutes from the start of the battery warming, the battery warming ends at 10:40 because the battery temperature reaches the target temperature and the vehicle arrives at the charging station.

In this case, the battery temperature is lowered from 10:40, i.e., when the battery warming ends, to 11:00, i.e., when the charging starts at the charging station, thereby having an effect on shortening the charging time at the start of the charging even though the pre-conditioning has been performed. If the battery temperature is maintained by additional control even after arrival at the charging station, it is disadvantageous in terms of the charging efficiency because energy is consumed as much as the maintained battery temperature.

On the other hand, when the estimated waiting time is additionally taken into account to perform the battery pre-conditioning, the battery warming starts at 10:30, i.e., when the target temperature reaching time is longer than or equal to the sum of the remaining time until arrival and the estimated waiting time, and the battery warming does not end even after arriving at the charging station at 10:40. Then, the battery warming ends at 11:00 as the battery temperature reaches the target temperature or as the target temperature reaching time, the remaining time until arrival, and the estimated waiting time have elapsed.

In this case, the battery warming is maintained up to 11:00 at which time the charging starts after the waiting time has elapsed, thereby more efficiently shortening the charging time. Further, the battery warming start time is controlled, thereby reducing wasteful battery pre-conditioning and decreasing the corresponding energy consumption.

Below, the process of performing the battery pre-conditioning based on the foregoing description will be described with reference to a flowchart.

Figure 4:
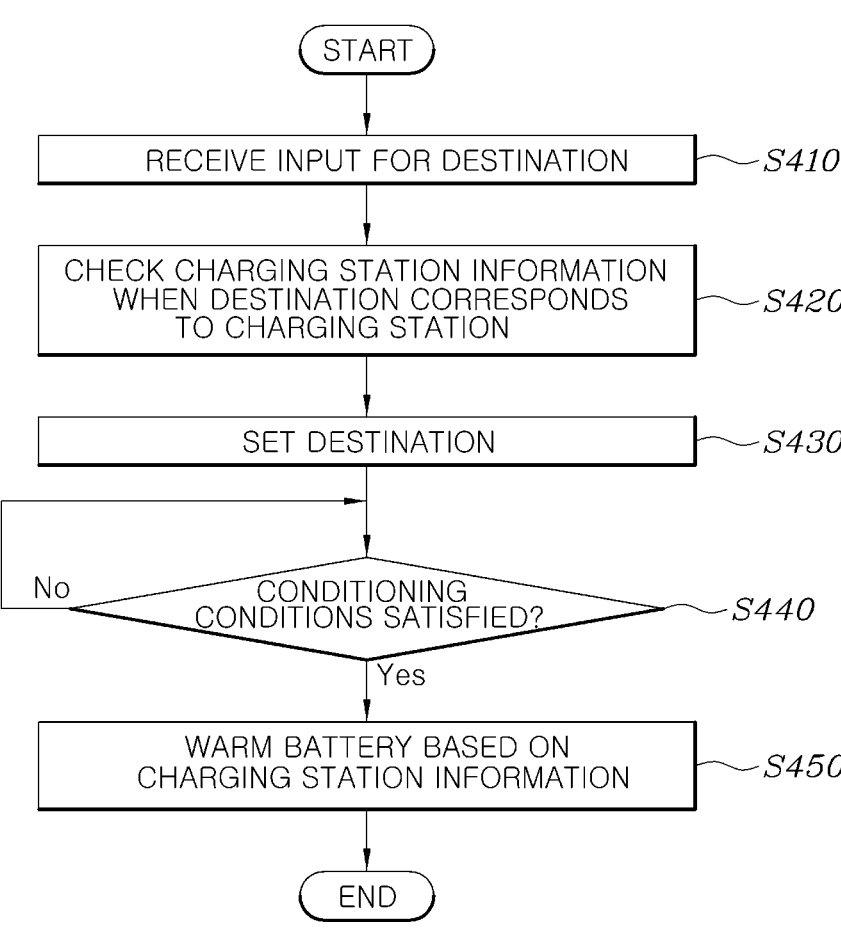
FIG. 4 is a flowchart showing a method of operating a battery pre-conditioning system according to an embodiment of the disclosure.

FIG. 4 is a flowchart showing a method of operating a battery pre-conditioning system according to an embodiment of the disclosure.

Referring to FIG. 4, the method of operating the battery pre-conditioning system includes the steps of receiving an input for the destination of the vehicle (S410), checking the charging station information including at least one of a distance between the vehicle and that charging station or the estimated waiting time of the charging station when the input destination is the charging station (S420), setting the destination based on the charging station information (S430), determining whether or not conditioning conditions are satisfied when the charging station is set as the destination (S440), and warming the battery based on the charging station information (S450) when the conditioning conditions are satisfied (Yes in S440).

In the method of operating the battery pre-conditioning system according to the disclosure, the charging station information is checked (S420), and the destination is set based on the checked charging station information (S430), so that a user can determine whether to use that charging station in consideration of not only a travel distance and an arrival time up to the charging station but also the situations of the charging station.

Further, the battery is warmed based on the charging station information (S450), so that the battery can be charged at the optimum charging temperature by more accurately predicting the charging start time, thereby decreasing unnecessary battery pre-conditioning to reduce energy consumption and improving a charging efficiency.

Below, a detailed process related to the embodiments of the disclosure will be described with reference to FIG. 5.

Figure 5:
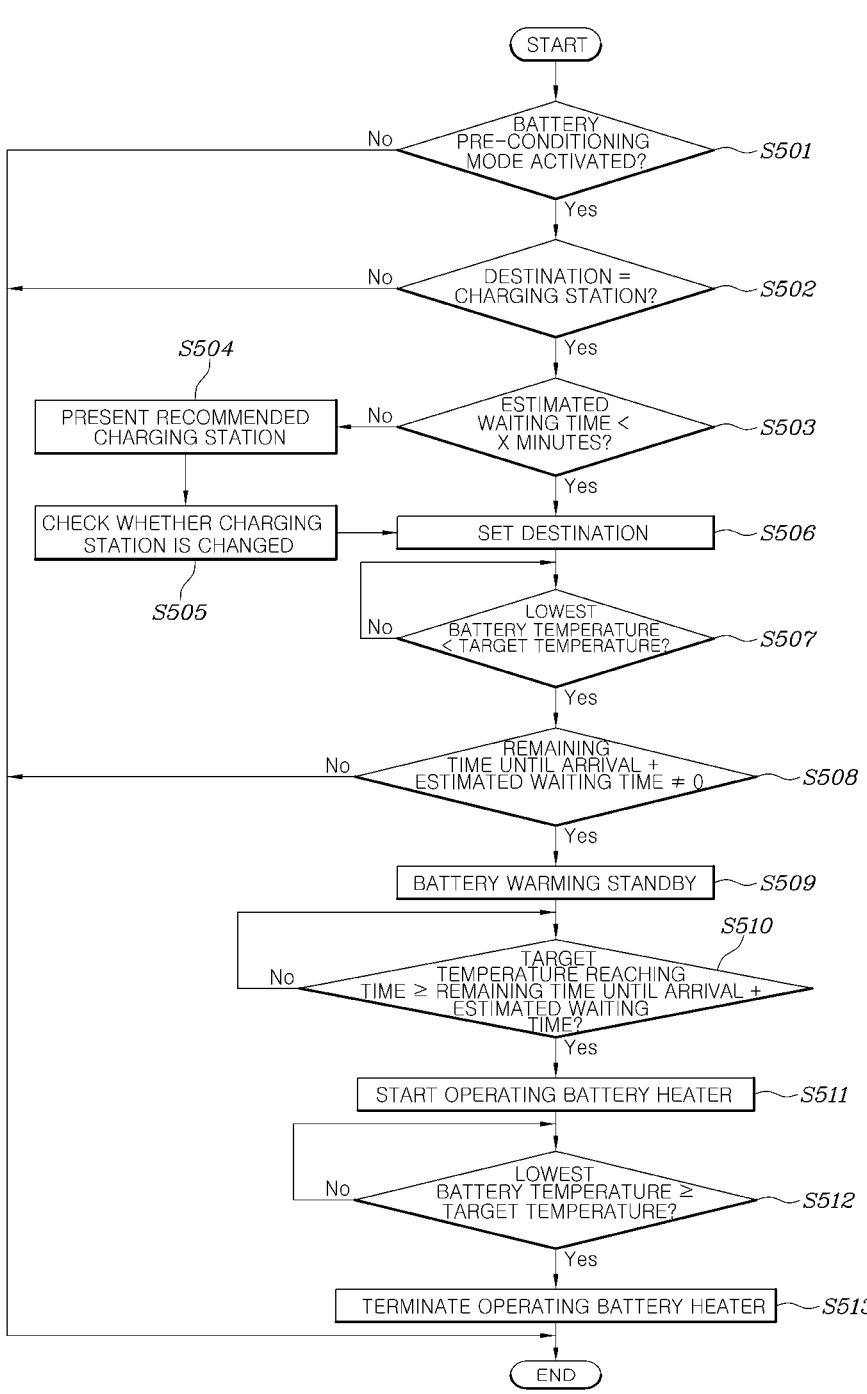
FIG. 5 is a detailed flowchart showing a method of operating a battery pre-conditioning system according to an embodiment of the disclosure.

FIG. 5 is a detailed flowchart showing the method of operating a battery pre-conditioning system according to an embodiment of the disclosure.

Referring to FIG. 5, the battery manager 20 first checks whether the battery pre-conditioning mode is activated or not (S501). In this case, the activation of the battery pre-conditioning mode may be determined based on a user's input information. As a result of checking the activation, when the battery pre-conditioning mode is not activated (No in S501), it is determined that the conditioning conditions are not satisfied, and the operations of the battery pre-conditioning system are terminated.

When the battery pre-conditioning mode is activated (Yes in S501), the destination manager 10 determines whether the input for the destination corresponds to the charging station (S502). When the input for the destination does not correspond to the charging station (No in S502), it is determined that a user has no intention of charging the battery, and the operations of the battery pre-conditioning system are terminated.

When the input for the destination corresponds the charging station (Yes in S502), the destination manager 10 checks whether the estimated waiting time of that charging station is shorter than a preset period of time (S503). When the estimated waiting time of that charging station is shorter than the preset period of time (Yes in S503), the destination is set as it is (S5o6). On the other hand, when the estimated waiting time of that charging station is greater than or equal to the preset period of time (No in S503), the destination manager 10 presents recommended charging stations (S5o4), and checks whether the charging station is changed or not (S505), thereby setting the destination (S5o6).

After the destination is set, the battery manager 20 checks whether the lowest battery temperature is lower than the target temperature, and determines that the conditioning conditions are met when the lowest battery temperature is lower than the target temperature (Yes in S507). Further, it may be determined whether the charging starts or not based on the remaining time until arrival and the estimated waiting time. When the remaining time until arrival or the estimated waiting time have not elapsed, it is determined that the charging does not start, thereby determining that the conditioning conditions are satisfied (Yes in S508).

When the conditioning conditions are all satisfied, the battery manager 20 enters a battery warming standby state before warming the battery based on the charging station information (S509). From the battery warming standby state, the battery manager 20 starts warming the battery based on the estimated waiting time, which may be performed by operating a battery heater (S511) at a point in time when the target temperature reaching time is greater than or equal to the sum of the remaining time until the arrival and the estimated waiting time (Yes in S510).

After the battery warming starts (S511), the operation of the battery heater is terminated (S513) when the lowest battery temperature reaches the target temperature (YES in S512).

On the contrary to the embodiment of FIG. 5, an embodiment of terminating the battery warming based on the distance between the vehicle and the charging station will be described below with reference to FIG. 6.

Figure 6:
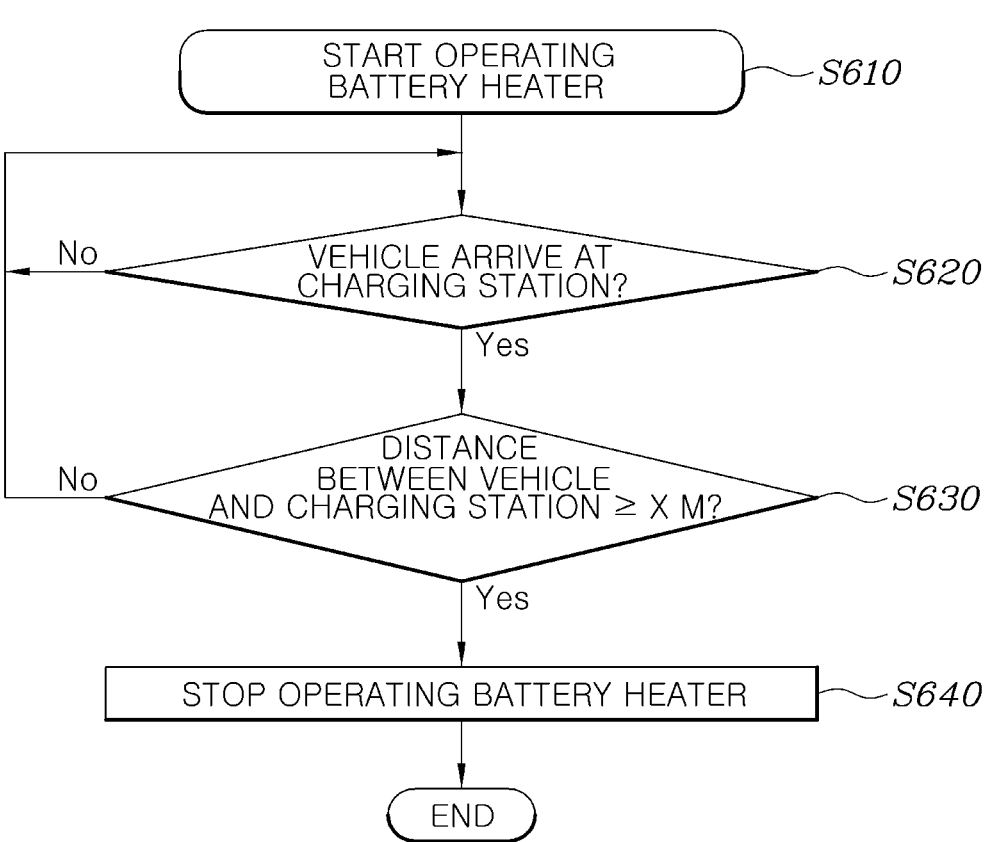
FIG. 6 is a flowchart showing a process of terminating battery warming in a method of operating a battery pre-conditioning system according to an embodiment of the disclosure.

FIG. 6 is a flowchart showing a process of terminating the battery warming in the battery pre-conditioning system according to an embodiment of the disclosure.

The method of operating the battery pre-conditioning system according to an embodiment of the disclosure includes the step of terminating the battery warming based on the distance between the vehicle and the charging station.

Referring to FIG. 6, after the battery heater operates to start warming the battery (S610), the destination manager 10 determines whether or not the vehicle arrives at the charging station (S620), and transmits a determination result to the battery manager 20. When the vehicle arrives at the charging station (YES in S620), the battery manager 20 determines that a user has no intention of waiting for the charging at that charging station when the distance between the vehicle that arrives at the charging station and the charging station becomes greater than or equal to a preset distance (YES in S630), i.e., when the vehicle leaves the charging station, and terminates the battery warming (S640). On the other hand, after the vehicle arrives at the charging station, the battery manager 20 determines that a user has an intention of waiting for the charging when the distance from the charging station is maintained within the preset distance, and maintains the battery warming (NO in S630).

Such operations may be applied together with the operation of starting the battery warming based on the target temperature reaching time, the remaining time until arrival, and the estimated waiting time, or may be separately applied independently of the battery pre-conditioning system.

As above, the battery warming is terminated based on the distance between the vehicle and the charging station, thereby performing the battery pre-conditioning based on a user's intention of waiting for the charging. When the vehicle leaves the charging station after arriving at the charging station, it is determined that a user has no intention of waiting for the charging, and the battery warming is automatically terminated, thereby skipping a separate process for terminating the battery warming. Further, when a user has no intention of waiting for the charging, it is possible to alleviate problems that energy is wastefully consumed by unnecessarily warming the battery and a charging efficiency is lowered.

With the foregoing configurations of the battery pre-conditioning system and the method of operating the same according to at least one embodiment of the disclosure, an actual charging start time is more accurately predicted to control the battery pre-conditioning.

Further, a user's intention of waiting for the charging is determined, and it is possible to prevent the battery pre-conditioning from being wastefully performed when the user has no intention of waiting for the charging.

In this way, the charging starts at the target battery temperature, thereby improving a charging efficiency and minimizing the unnecessary battery pre-conditioning.

Effects obtainable from embodiments of the disclosure may not be limited by the aforementioned effects, and other unmentioned effects can be clearly understood from the following description by a person having ordinary knowledge in the art to which the disclosure pertains.

What is claimed is:

1. A method of operating a battery pre-conditioning system, the method comprising:
   checking charging station information comprising an estimated waiting time for a charging start from arrival at a charging station when an input for a destination corresponds to the charging station; and
   starting a battery warming based on a target temperature reaching time for a battery temperature to reach a target temperature, the estimated waiting time, and a remaining time until the arrival at the charging station.

2. The method of claim 1, wherein starting the battery warming comprises starting the battery warming at a point in time when the target temperature reaching time is greater than or equal to a sum of the estimated waiting time and the remaining time until the arrival.

3. The method of claim 2, further comprising terminating the battery warming when the battery temperature reaches the target temperature or when the target temperature reaching time has elapsed.

4. The method of claim 1, further comprising, after the arrival at the charging station by a vehicle, terminating the battery warming when a distance between the vehicle and the charging station is longer than or equal to a preset distance.

5. The method of claim 1, further comprising determining whether or not conditioning conditions are satisfied, based on the battery temperature, whether a battery pre-conditioning mode is activated or not, whether charging starts or not, or whether the charging station supports fast charging or super-fast charging, wherein starting the battery warming comprises starting the battery warming based on the target temperature reaching time, the estimated waiting time, and the remaining time until the arrival when the conditioning conditions are satisfied.

6. The method of claim 1, further comprising:

checking whether the charging station is changed or not, when the estimated waiting time of the charging station corresponding to the input for the destination is longer than or equal to a preset period of time; and setting the destination based on a result of checking whether the charging station is changed or not.

7. The method of claim 6, wherein checking whether the charging station is changed or not comprises recommending an additional charging station that satisfies a certain condition as the destination.

8. The method of claim 1, further comprising displaying an operation state of battery pre-conditioning.

9. A battery pre-conditioning system comprising:

a destination manager configured to check charging station information comprising an estimated waiting time for a charging start from arrival at a charging station when an input for a destination corresponds to the charging station; and a battery manager configured to start a battery warming based on a target temperature reaching time for a battery temperature to reach a target temperature, the estimated waiting time, and a remaining time until the arrival at the charging station.

10. The battery pre-conditioning system of claim 9, wherein the battery manager is configured to start the battery warming at a point in time when the target temperature reaching time is greater than or equal to a sum of the estimated waiting time and the remaining time until the arrival.

11. The battery pre-conditioning system of claim 10, wherein the battery manager is configured to terminate the battery warming when the battery temperature reaches the target temperature or when the target temperature reaching time has elapsed.

12. The battery pre-conditioning system of claim 9, wherein, after the arrival at the charging station by a vehicle, the battery manager is configured to terminate the battery warming when a distance between the vehicle and the charging station is longer than or equal to a preset distance.

13. The battery pre-conditioning system of claim 9, wherein the battery manager is configured to:

determine whether or not conditioning conditions are satisfied, based on the battery temperature, whether a battery pre-conditioning mode is activated or not, whether charging starts or not, or whether the charging station supports fast charging or super-fast charging; and start the battery warming based on the target temperature reaching time, the estimated waiting time, and the remaining time until the arrival when the conditioning conditions are satisfied.

14. The battery pre-conditioning system of claim 9, wherein the destination manager is configured to:

check whether the charging station is changed or not, when the estimated waiting time of the charging station corresponding to the input for the destination is longer than or equal to a preset period of time; and set the destination based on a result of checking whether the charging station is changed or not.

15. The battery pre-conditioning system of claim 14, wherein the destination manager is configured to recommend an additional charging station that satisfies a certain condition as the destination.

16. The battery pre-conditioning system of claim 9, further comprising a display configured to display an operation state of battery pre-conditioning.

17. The battery pre-conditioning system of claim 16, wherein the display comprises a cluster of a vehicle, an audio/video/navigation/telematics (AVNT), or a combination thereof.

18. The battery pre-conditioning system of claim 17, wherein the destination manager comprises the AVNT of the vehicle.

19. The battery pre-conditioning system of claim 9, wherein the battery manager comprises a battery management system of a vehicle, a vehicle control unit, a hybrid control unit, or a combination thereof.

20. A battery pre-conditioning system comprising:

a destination manager configured to check charging station information comprising a distance between a vehicle and a charging station after arrival at the charging station when an input for a destination corresponds to the charging station; and a battery manager configured to terminate battery warming at a point in time when the distance between the vehicle and the charging station is longer than or equal to a preset distance after the arrival at the charging station.

* * * * *